(12) United States Patent
Salo et al.

(10) Patent No.: US 7,461,350 B2
(45) Date of Patent: Dec. 2, 2008

(54) APPLICATION SPECIFIC KEY BUTTONS IN A PORTABLE DEVICE

(75) Inventors: Juha H. Salo, Littoinen (FI); Larri Vermola, Turku (FI); Tero Naumi, Koski TL (FI)

(73) Assignee: Nokia Corporation, Espoo (FI)

( * ) Notice: Subject to any disclaimer, the term of this patent is extended or adjusted under 35 U.S.C. 154(b) by 538 days.

(21) Appl. No.: 11/027,070

(22) Filed: Dec. 30, 2004

(65) Prior Publication Data

US 2006/0149809 A1 Jul. 6, 2006

(51) Int. Cl.
*G06F 3/00* (2006.01)
(52) U.S. Cl. .................... 715/773; 715/765
(58) Field of Classification Search ............. 715/716, 715/735, 744, 810, 825, 827, 840, 841, 864, 715/773, 765; 345/169, 173
See application file for complete search history.

(56) References Cited

U.S. PATENT DOCUMENTS

| | | | |
|---|---|---|---|
| 5,038,401 A | | 8/1991 | Inotsume |
| 5,408,060 A | | 4/1995 | Muurinen |
| 5,410,326 A | | 4/1995 | Goldstein |
| 5,450,079 A | * | 9/1995 | Dunaway ................ 341/23 |
| 5,555,550 A | | 9/1996 | Kaschke |
| 5,905,493 A | * | 5/1999 | Belzer et al. .............. 715/835 |
| 5,936,554 A | | 8/1999 | Stanek |
| 6,046,730 A | | 4/2000 | Bowen et al. |
| 6,134,548 A | * | 10/2000 | Gottsman et al. ........... 707/5 |
| 6,168,283 B1 | | 1/2001 | Howell |
| 6,192,340 B1 | | 2/2001 | Abecassis |
| 6,211,870 B1 | * | 4/2001 | Foster ..................... 715/744 |
| 6,310,609 B1 | | 10/2001 | Morgenthaler |
| 6,437,836 B1 | | 8/2002 | Huang et al. |
| 6,674,854 B1 | | 1/2004 | Kawano et al. |
| 6,720,863 B2 | | 4/2004 | Hull |
| 2001/0048379 A1 | | 12/2001 | Kaikuranta et al. |
| 2003/0034878 A1 | | 2/2003 | Kaikuranta |
| 2003/0103088 A1 | * | 6/2003 | Dresti et al. ............ 345/835 |
| 2004/0119601 A1 | | 6/2004 | Colorado |

FOREIGN PATENT DOCUMENTS

| | | |
|---|---|---|
| EP | 0637171 | 8/1994 |
| EP | 1107209 | 6/2001 |
| EP | 1133088 | 9/2001 |
| EP | 1324605 | 7/2003 |
| GB | 2347051 | 8/2000 |
| WO | WO00/78050 | 12/2000 |
| WO | WO01/43433 | 6/2001 |
| WO | WO01/60089 | 8/2001 |
| WO | 02/13001 | 2/2002 |
| WO | WO03/052574 | 6/2003 |
| WO | WO03/063475 | 7/2003 |

\* cited by examiner

*Primary Examiner*—Kieu D Vu
(74) *Attorney, Agent, or Firm*—Banner & Witcoff, Ltd.

(57) ABSTRACT

Aspects of the invention implement and execute commands of applications and/or services on portable devices with various key button configurations. Certain aspects of the invention create and display an intermediary user interface on a display of a portable device in order to match and utilize an application's commands with the various capabilities of different portable devices.

45 Claims, 9 Drawing Sheets

APPLICATION SPECIFIC KEY BUTTONS IN A PORTABLE DEVICE

FIELD OF THE INVENTION

The present invention relates generally to implementing commands of an application using limited key buttons or selection apparatus on an input device having a display. More specifically, aspects of the present invention concern creating and displaying an intermediary user interface on a display of a portable device in order to match and utilize an application's commands with different portable devices input capabilities.

BACKGROUND OF THE INVENTION

A variety of mobile computing devices exist, such as personal digital assistants (PDAs), mobile phones, digital cameras, digital players, mobile terminals, etc. (hereinafter referred to as "mobile devices"). These devices perform various functions specific to the device, and are often able to communicate (via wired or wireless connection) with other devices. A single mobile device may, for example, provide Internet access, maintain a personal calendar, provide mobile telephony, and take digital photographs. These mobile computing devices may also be capable of receiving broadcasting services and multi-media content distributed by such broadcasting services.

Digital broadcast technologies using standards such as DVB-T (Digital Video Broadcast-Terrestrial) are rapidly expanding in various countries around the world. Other standards such as DVB-MHP (Digital Video Broadcast-Multimedia Home Platform) and DVB-H (Digital Video Broadcast-Handheld) are taking the DVB-T standard further by enabling digital content providers to address all types of terminals ranging from low-end to high-end set top boxes, integrated digital TV sets and multimedia PCs. In addition, the standards provide for the reception of digital broadcasting with handheld devices. The DVB transmission technology (also known as IP datacasting) may also be combined with Internet Protocol (IP). The combination makes it possible to transfer digital content as IP packets. IP datacasting offers the advantage that all existing IP-based digital content such as video streams, web pages, music files, or game software may be distributed over a mobile broadcast. IP datacasting for mobile devices, as compared to traditional broadcasting, creates a variety of advantages over traditional broadcasting systems such as the transmission of additional services over the same channel.

Various portable devices, however, have different capabilities as numerous portable devices are designed for specific applications and/or services. For instance, a user may play games on his/her mobile telephone. The games, however, may have been originally designed to be played on a particular handheld gaming device. The handheld gaming device may have been designed with a specific button or input configuration in order to optimize playing of the game or application. As another example, a mobile communication device may be able to receive digital television broadcasting. However, the mobile communication device may not be capable of utilizing value added services such as a Text-TV service due to the configuration of the controls or keys on the mobile communication device. A user of a portable device, however, should be able to receive the service and/or application in a seamless fashion and be able to utilize such service and/or application with the specific button or input configuration of the portable device.

Therefore, for these and other reasons, there remains a need by which a user can efficiently use the input configuration of a portable device with various different applications and/or services.

SUMMARY OF THE INVENTION

Aspects of the present invention provide for the utilization of an application and/or service on a portable device having a keypad and a display. In an aspect of the invention, a portable device receives an application and/or service and stores the application or service in memory of the portable device. A command profile is created for each application and/or service that may be executed on the portable device. In addition, a key button profile may be retrieved for the portable device. Key buttons located on the portable device may be associated with executable commands to be performed by an application and/or service running on the portable device. The command profile and the key button profile are compared in order to create an intermediary user interface which may be displayed on the display of the portable device as part of the user interface. Intermediary buttons displayed on the intermediary user interface portion of the user interface correspond to the created intermediary user interface.

These and other features of the invention will be apparent upon consideration of the following detailed description of preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

Example Operating Environment

Figure 1:
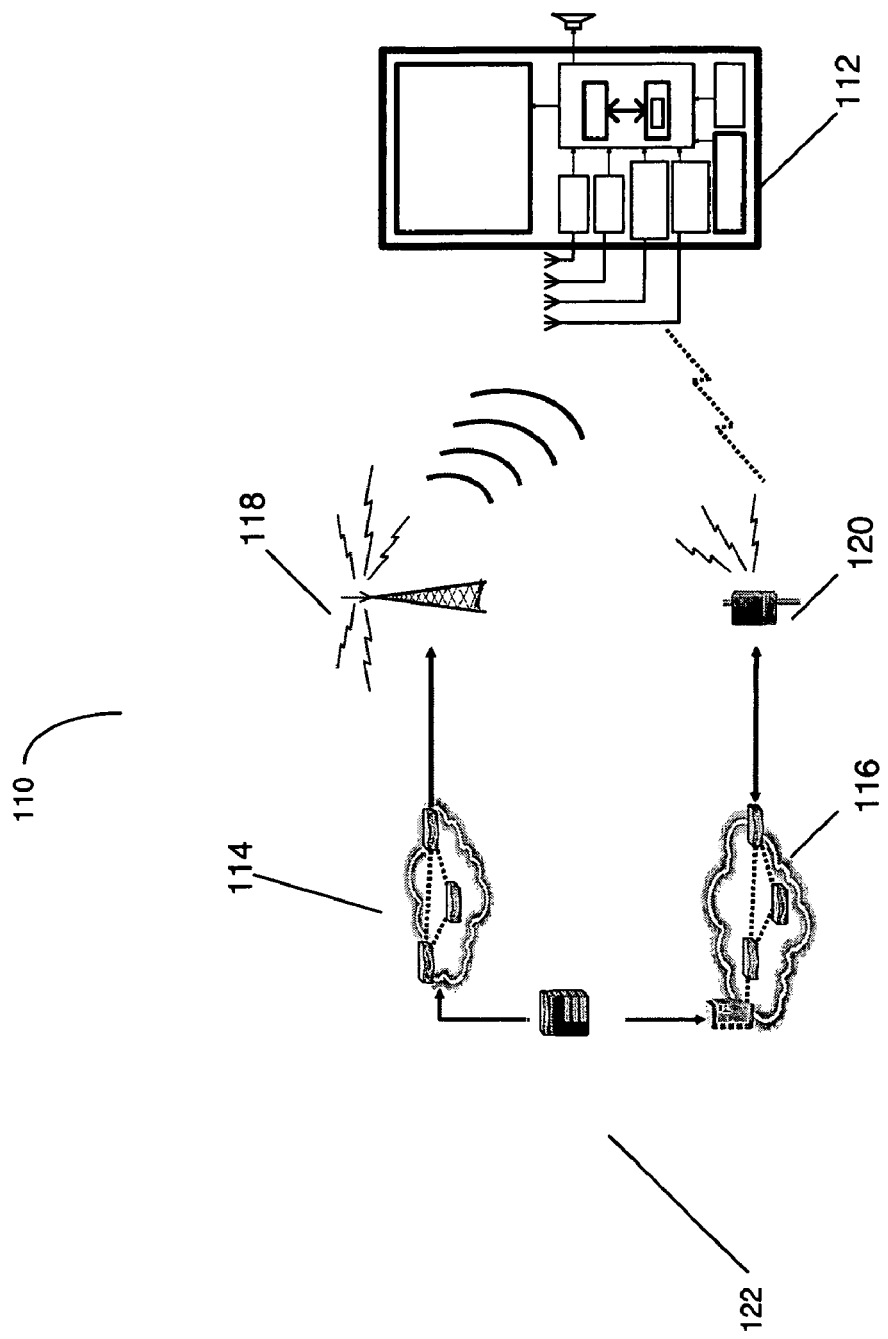
FIG. 1 illustrates a block diagram of a wireless communication system in which various aspects of the present invention may be implemented.

FIG. 1, one embodiment of the invention, shows an example of a wireless communication system 110 in which the systems and methods of the present invention may be advantageously employed. One or more network-enabled portable devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or cellular network 116 and/or a wired network (not shown). The portable device 112 may comprise a digital broadcast receiver device. The service source 122 may be connected to several service providers that may provide their actual program content or information or description of their services and programs to the service source that further provides the content or information to the receiver device 112. The several service providers may include but are not limited to one or more television and/or digital television service providers, AM/FM radio service providers, SMS/MMS push service providers, Internet content or access providers.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116. The receiver device 112 may also contact the service source 122 through the cellular network 116.

The cellular network 116 may comprise a wireless network and a base transceiver station transmitter 120. The cellular network may include a second/third-generation (2G/3G) cellular data communications network, a Global System for Mobile communications network (GSM), or other wireless communication network such as a WLAN network.

In one aspect of the invention, receiver device 112 may comprise a wireless interface configured to send and/or receive digital wireless communications within cellular network 116. The information received by receiver device 112 through the cellular network 116 or broadcast network 114 or wired network may include user selection, applications, services such as games, electronic service guides, JAVA applets, MHP applications, teletext, text-TV, electronic images, audio clips, and video clips. Additionally, the information received by receiver device 112 may be interactive, i.e. include applications that creates or needs back channel to an interactive service provider. As part of cellular network 116, one or more base stations (not shown) may support digital communications with receiver device 112 while the receiver device is located within the administrative domain of cellular network 116.

Figure 2:
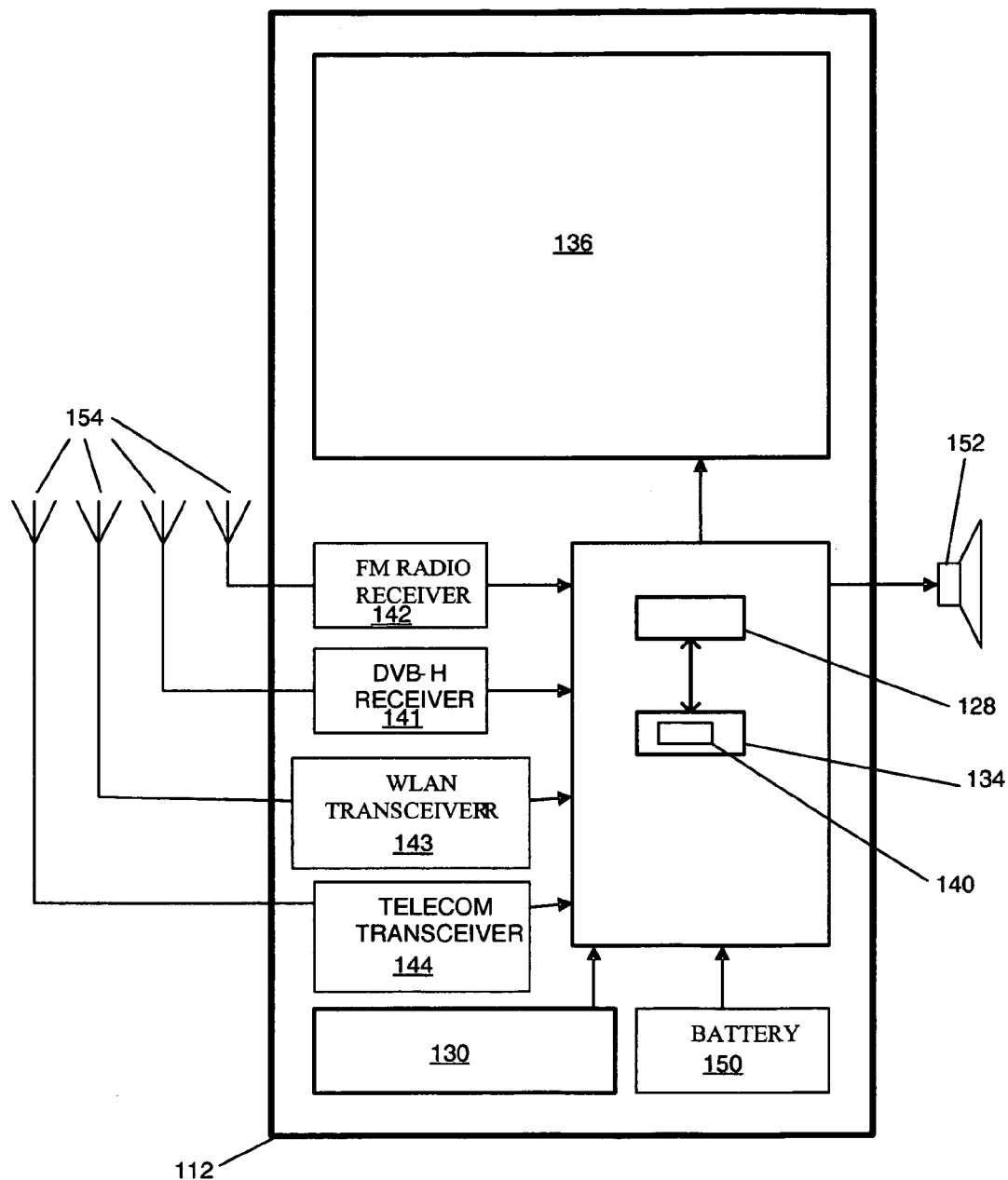
FIG. 2 illustrates a block diagram of a portable device in accordance with an aspect of the present invention.

As shown in FIG. 2, one embodiment of the invention, receiver device 112 may include processor 128 connected to user interface 130, memory 134 and/or other storage, and display 136. Receiver device 112 may also include battery 150, speaker 152 and antennas 154. User interface 130 may further include a keypad, touch screen, voice interface, four arrow keys, joy-stick, data glove, mouse, roller ball, touch screen, voice interface, or the like.

Computer executable instructions and data used by processor 128 and other components within receiver device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling receiver device 112 to perform various functions. Alternatively, some or all of receiver device 112 computer executable instructions may be embodied in hardware or firmware (not shown).

Receiver device 112 may be configured to receive, decode and process transmissions based on the Digital Video Broadcast (DVB) standard, such as DVB-H or DVB-MHP, through a specific DVB receiver 141. Additionally, receiver device 112 may also be configured to receive, decode and process transmissions through FM/AM Radio receiver 142, WLAN transceiver 143, Bluetooth transceiver (not shown) and telecommunications transceiver 144.

For example, receiver device 112 may include a DVB or digital television signal receiver 141. In an example of the DVB standard, one DVB 10 Mbit/s transmission may have 200, 50 kbit/s audio program channels or 50, 200 kbit/s video (TV) program channels. In an aspect of the invention, the receiver device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats, such as digital TV or digital radio, may alternatively be used to deliver content and information of availability of supplemental services, such as ATSC (Advanced Television Systems Committee), NTSC (National Television System Committee), ISDB (Integrated Services Digital Broadcasting), DAB (Digital Audio Broadcasting), DMB (Digital Multimedia Broadcasting) or DIRECTV. Additionally, the digital transmission may be time sliced, such as in DVB-H technology or time-sliced IPDC. In case of digital transmission, the receiver device 112 has one or more signal decoders and one or more buffer memories for storing the decoded digital transmission, such as any DVB or time sliced transmission, before presentation.

Description of Illustrative Aspects of the Invention

According to an aspect of the invention, an intermediary user interface may be created and displayed on a display of a portable device in order to match and utilize an application's commands with the portable device's input capabilities. Aspects of the invention may be implemented in displaying any kind of application in any kind of portable device, especially when the application and/or service may not be specifically designed for the type of user interface utilized by the portable device.

Figure 3:
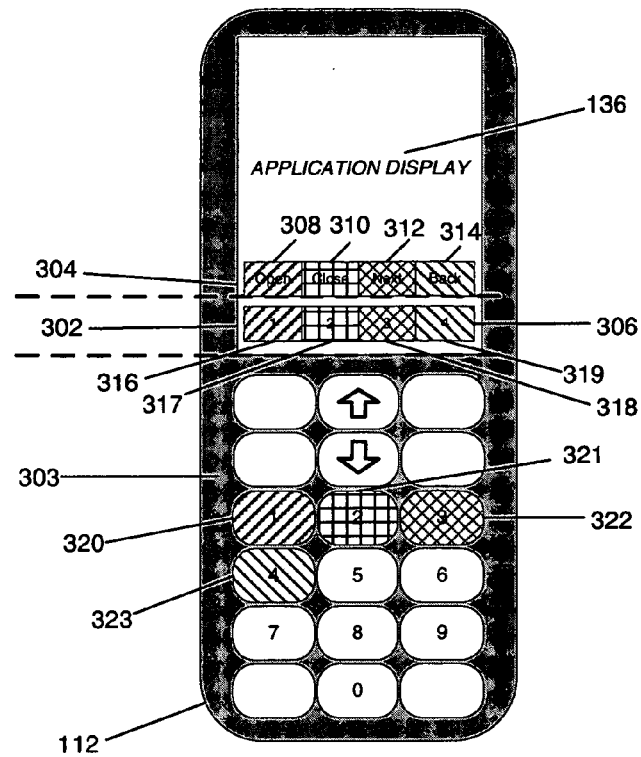
FIG. 3 illustrates a portable device with an intermediary user interface in accordance with an aspect of the present invention.

FIGS. 3-6 illustrate various intermediary user interfaces displayed on portable devices 112 in accordance with various aspects of the present invention. In FIG. 3, a key button correlation intermediary user interface 302 is created, if the number of the key buttons 303 on the side of the display 136 of the portable device 112 is less than the number of the application commands for a received or used application and/ or service. The key buttons 303 may include numerical keys 0-9, letter keys A - Z, arrow keys (up, down, left, right), joystick, or other keys as known and realized by those skilled in the art.

As illustrated in FIG. 3, in one embodiment of the invention, portable device 112 may comprise display 136 which may be divided into various areas such as application user interface display area 304 and intermediary user interface display area 306. The key button correlation intermediary user interface 302 may display the correlations between the application and/or service commands and the key buttons 303 of the portable device 112. The correlations may be generated by a correlation application. The correlation application may make and/or create correlations on a system level. In addition the correlation application may generate and/or create the intermediary user interface 302 that indicates the displayed correlations.

As shown in FIG. 3, application user interface display area 304 illustrates four commands that may be executed by an application and/or service being emulated on portable device 112. These commands may include an "Open" command 308, a "Close" command 310, a "Next" command 312, and a "Back" command 314. Those skilled in the art will realize that many other different and additional commands may be executed by various applications and/or services as the above four command are utilized to illustrate the invention.

Key button correlation intermediary user interface 302 may display intermediary buttons or visual cues 316-319 on display 136. Intermediary buttons or visual cues 316-319 may define the correlations for the four illustrated commands. For example, intermediary button 316 associates the "Open" command 308 with key button "1" (320) by displaying a number 1 in the intermediary button with an indication of the command, such as a color code or command name "Open." Intermediary button 317 may associate or map the "Close" command 310 to key button "2" (321) by displaying a number 2 in the intermediary button with an indication of the command, such as a color code or command name "Close." Analogically to above, intermediary button 318 may correlate the "Next" command 312 to key button "3" (322). Finally, as shown in FIG. 3 and analogically to above, intermediary button 319 may correlate or map the "Back" command 314 to key button "4" (323) on portable device 112. The key button correlation intermediary user interface 302 may assist a user by indicating to the user the correlation between the key buttons 303 and the application and/or service commands. In one aspect of the invention, users may be able to view the intermediary user interface and the application user interface on the display device 136 substantially simultaneously.

Figure 3A:
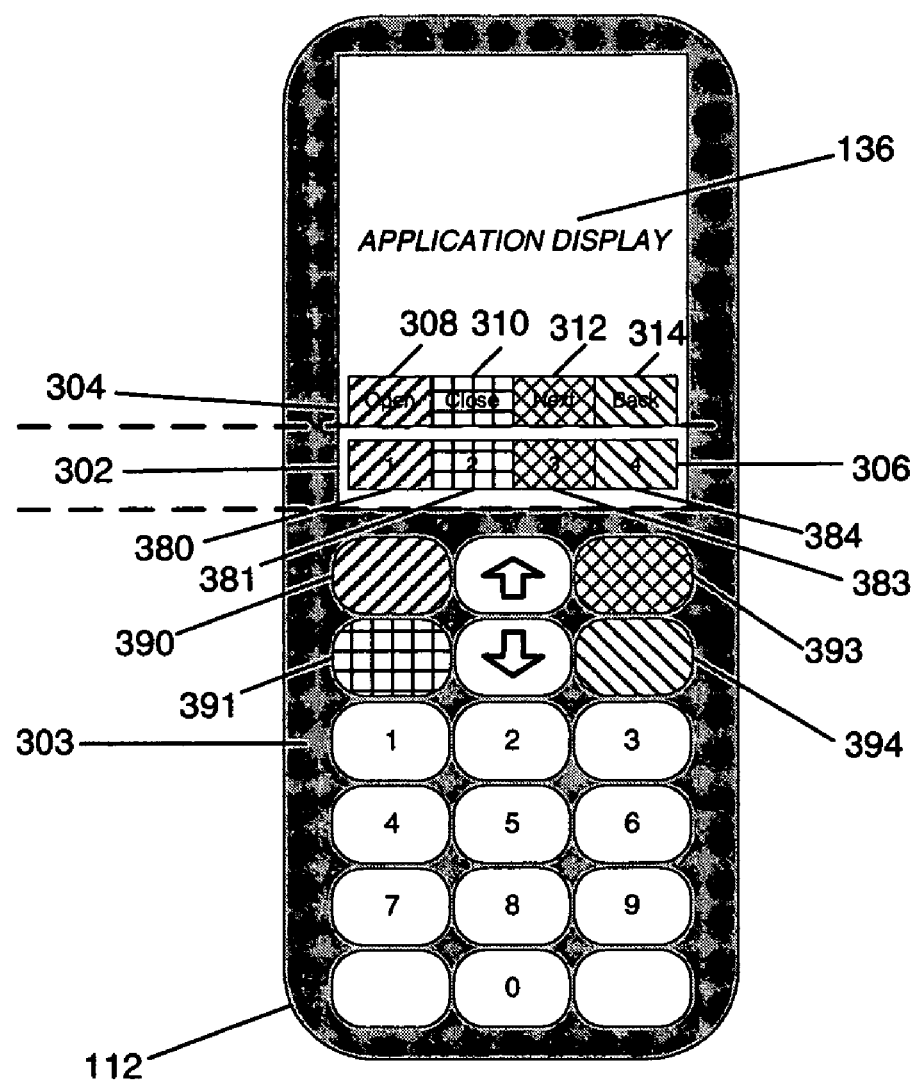
FIG. 3A illustrates a device using color coding with an intermediary user interface in accordance with and aspect of the present invention.

In one embodiment of the invention, indications of the mapping of the commands to the key buttons may be displayed to the user by use of various color indicators as shown in FIG. 3A. Color indicators may include the use of various colors such as red, green, yellow, and blue to indicate the correlation between the application and/or service commands and the key buttons 303. As those skilled in the art will realize, indicators such as color indicators may be displayed using LEDs or surface emitting lasers which may be provided adjacent to the key buttons. Multiple LEDs may also be associated with each key button 303. In alternative embodiments, other suitable indicators may include different color icons or thumbnails displayed on the intermediary user interface. As shown in FIG. 3A, intermediary buttons or visual cues 380-384 may define the correlations for the four illustrated commands. For example, intermediary button 381 may associate the "Open" command 308 with key button 390 by displaying a particular color such as red. Intermediary button 381 may associate or map the "Close" command 310 to key button 391 by displaying a particular color such as green. Analogically to above, intermediary button 383 may correlate the "Next" command 312 to key button 393 by displaying a particular color such as yellow. Finally, as shown in FIG. 3A and analogically to the above, intermediary button 384 may correlate or map the "Back" command 314 to key button 394 using a color such as blue on portable device 112.

Figure 4:
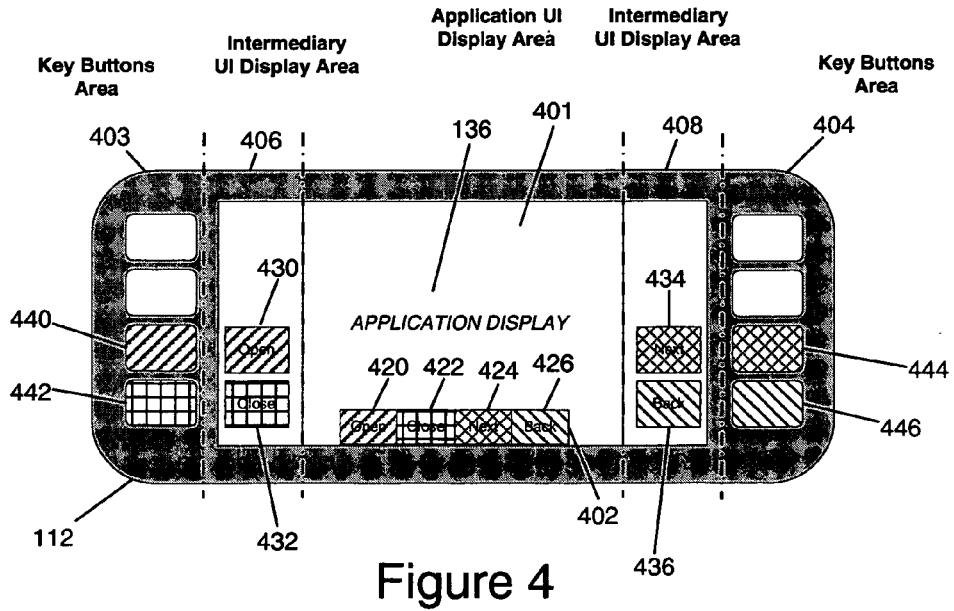
FIG. 4 shows a diagram of a portable device with an alternative intermediary user interface in accordance with an aspect of the present invention.

FIG. 4, one embodiment of the invention, illustrates an alternative diagram of a portable device 112 with an intermediary user interface in accordance with another aspect of the invention. In FIG. 4, a graphical intermediary user interface 402 is created, if the total number of key buttons (403 and 404) on the sides of the display 136 are equal to or greater than the number of applications commands for a received or used application and/or service. As illustrated in FIG. 4, portable device 112 may comprise display 136 which may be divided into various areas such as application user interface display area 401 and intermediary user interface display areas 406 and 408. User interface display areas 406 and 408 may display the correlations between the application and/or service commands and the key buttons (403 and 404) of the portable device 112. The correlations may be generated by a correlation application. The correlation application may make and/ or create correlations on a system level. In addition, the correlation application may generate and/or create the intermediary user interface 406 and 408.

Application user interface display area 401 illustrates four commands that may be executed by an application and/or service being emulated on portable device 112. These commands may include an "Open" command 420, a "Close" command 422, a "Next" command 424, and a "Back" command 426. Those skilled in the art will realize that many other different and additional commands may be executed by various applications and/or services.

Location graphical intermediary user interface 402 may display intermediary buttons or visual cues (430, 432, 434, and 436) which are next to key buttons such as key buttons (440, 442, 444, and 446). For example, intermediary button 430 may associate the "Open" command 420 with key button 440 by displaying in the intermediary button an indication of the command, such as a color code or command name "Open" and displaying the intermediary button next to or adjacent to the key button. Intermediary button 432 may associate or map the "Close" command 422 to key button 442 by displaying in the intermediary button an indication of the command, such as a color code or command name "Close" and displaying the intermediary button next to or adjacent to the key button. Analogically, intermediary button 434 may correlate the "Next" command 424 to key button 444. Finally, analogically, as shown in FIG. 4, intermediary button 436 may correlate or map the "Back" command 426 to key button 446 on portable device 112. The intermediary buttons may define the content of the application and/or service commands. As described above, indicators such as LEDs may be used in the key buttons to display the various mappings to users.

Figure 5:
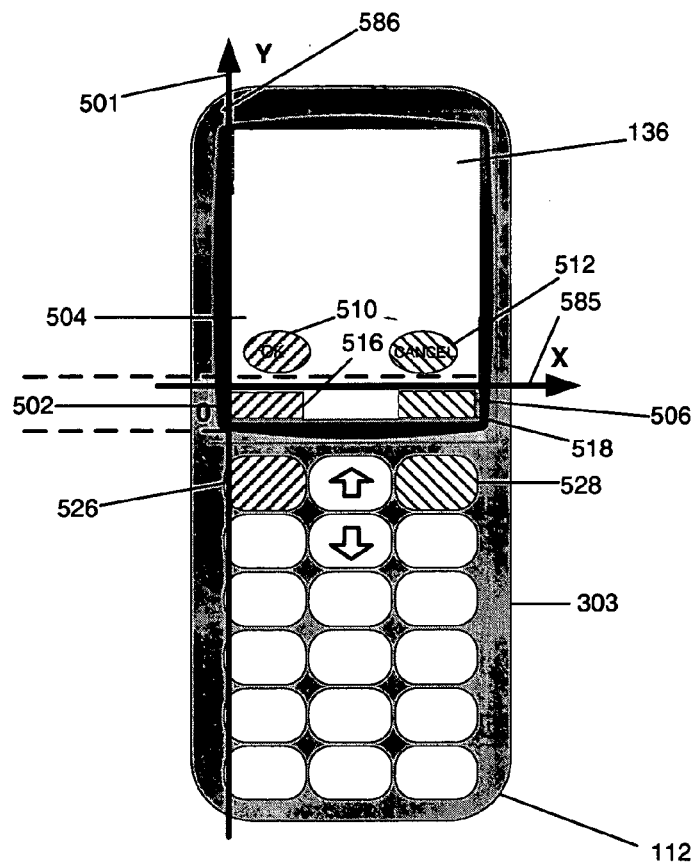
FIG. 5 shows a diagram of a portable device with a specific location graphical intermediary user interface in accordance with an aspect of the present invention.

FIG. 5, one embodiment of the invention, illustrates another aspect of the invention. In FIG. 5, a specific location graphical intermediary user interface 502 is created, if the number of key buttons 303 on the sides of the display 136 is greater than or equal to the number of applications commands for a received or used application and/or service and the location of the commands corresponding to the application and/or service are located adjacent to the locations of key buttons 303.

As illustrated in FIG. 5, portable device 112 may comprise display 136 which may be divided into various areas such as application user interface display area 504 and intermediary user interface display area 506. Application user interface display area 504 illustrates two commands that may be executed by an application and/or service being emulated on portable device 112. These commands may include an "OK" command cue 510 and a "Cancel" command cue 512. Those skilled in the art will realize that many other different and additional commands may be executed by various applications and/or services. Each of the various commands may be associated with a different command cue. Portable device 112 may comprise key buttons 303 that may include key buttons 526 and 528. As illustrated in FIG. 5, key buttons 526 and 528 may be in a location next to or adjacent to the location of command cues 510 and 512. Similarly, specific location graphical intermediary user interface 502 may display intermediary buttons or visual cues (516 and 518) which are next to key buttons such as key buttons (526 and 528). For example, intermediary button 516 may associate the "OK" command 510 with key button 526 by being in between the command and the key button, i.e. any indication of the command is not presented in the intermediary button. Additionally, analogically, intermediary button 518 may correlate the "Cancel" command 512 to key button 528. The intermediary buttons 516 and 518 may define the content of the application and/or service commands.

Figure 7:
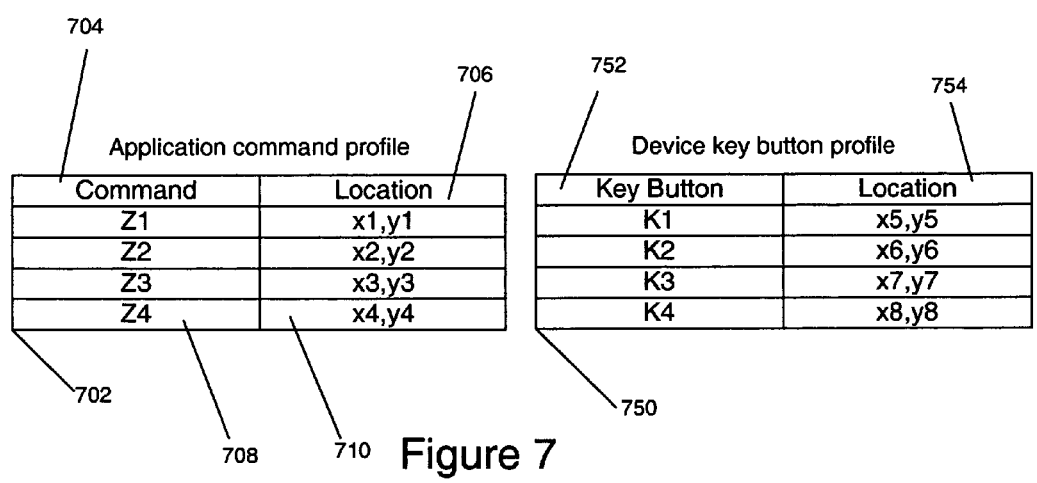
FIG. 7 illustrates in table form a command profile and a key button profile in accordance with an aspect of the present invention.

For determining the locations of the commands, a coordinate system may be created in portable device 112. The coordinate system may be factory set by the manufacturer of the particular portable device 112. The same coordinate referencing system may also be used for determining the locations of key buttons 303 of portable device 112. For example, a coordinate system such as coordinate system 501 may be defined with an x-axis 585 and y-axis 586. The coordinate system may allow for the identification of the coordinate positions (x,y) of both command cues and/or key buttons. For example, as shown in FIG. 7, in one embodiment of the invention, a key button profile 750 may be retrieved from a particular portable device 112. The key button profile 750 may comprise a listing of locations 754 of the key buttons 752 for portable device 112. The key button profile 750 may also contain type/content of the key buttons, number of the key buttons, and their location on display 136.

A command profile such as command profile 702 may be created for a used application and/or service. For example, FIG. 7 illustrates an exemplary command profile for an application. Command profile 702 may comprise a listing of locations 706 for each command 704 associated with a particular application. For example, a visual cue for command "Z4" may found at coordinates x4,y4 (710) on the particular portable device 112.

Figure 6:
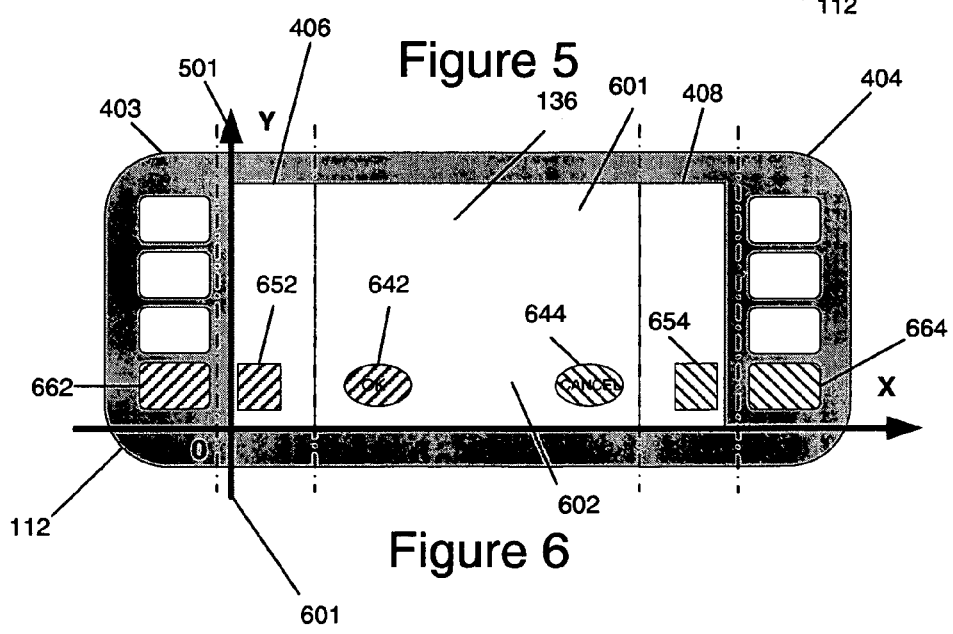
FIG. 6 shows an alternative diagram of a portable device with a specific location graphical intermediary user interface in accordance with an aspect of the present invention.

FIG. 6, one embodiment of the invention, illustrates another aspect of the invention in which a specific location graphical intermediary user interface similar to FIG. 5 is created, if the number of key buttons (403 and 404) on the sides of the display 136 are greater than or equal to the number of applications commands for a received or used application and/or service and the location of the commands corresponding to the application and/or service are located adjacent to the locations of key buttons (403 and 404). Similar to FIG. 5, a coordinate system 501 may be utilized in portable device 112 to determine the location of a command for an application and/or service.

As illustrated in FIG. 6, portable device 112 may comprise display 136 which may be divided into various areas such as application user interface display area 601 and intermediary user interface display areas 406 and 408. The display may comprise one or more intermediary user interface display areas based on locations of the key buttons on the sides of the display.

Application user interface display area 601 illustrates two commands that may be executed by an application and/or service being emulated on portable device 112. These commands may include an "OK" command 642 and a "Cancel" command 644. Those skilled in the art will realize that many other different and additional commands may be executed by various applications and/or services.

Specific location graphical intermediary user interface 602 may display intermediary buttons or visual cues (652 and 654) which may be next to key buttons such as key buttons (662 and 664). For example, intermediary button 652 may associate the "OK" command 642 with key button 662 by being in between the command and the key button.

Similarly, intermediary button 654 may associate or map the "Cancel" command 644 to key button 664. The intermediary buttons may define the content of the application and/or service commands.

In another aspect of the invention, a combination of a location graphical intermediary user interface and key button correlation intermediary user interface may be created. A combination of a location graphical intermediary user interface and key button correlation intermediary user interface may be created if the number of the key buttons on the side of the display of the user device is less than the number of application commands and if at least one of the key buttons are adjacent to the locations of the commands corresponding to the application and/or service. Intermediary buttons may be displayed on the intermediary user interface adjacent to select key buttons. In addition, correlations may be created for commands that are not adjacent to select key buttons.

Figure 8:
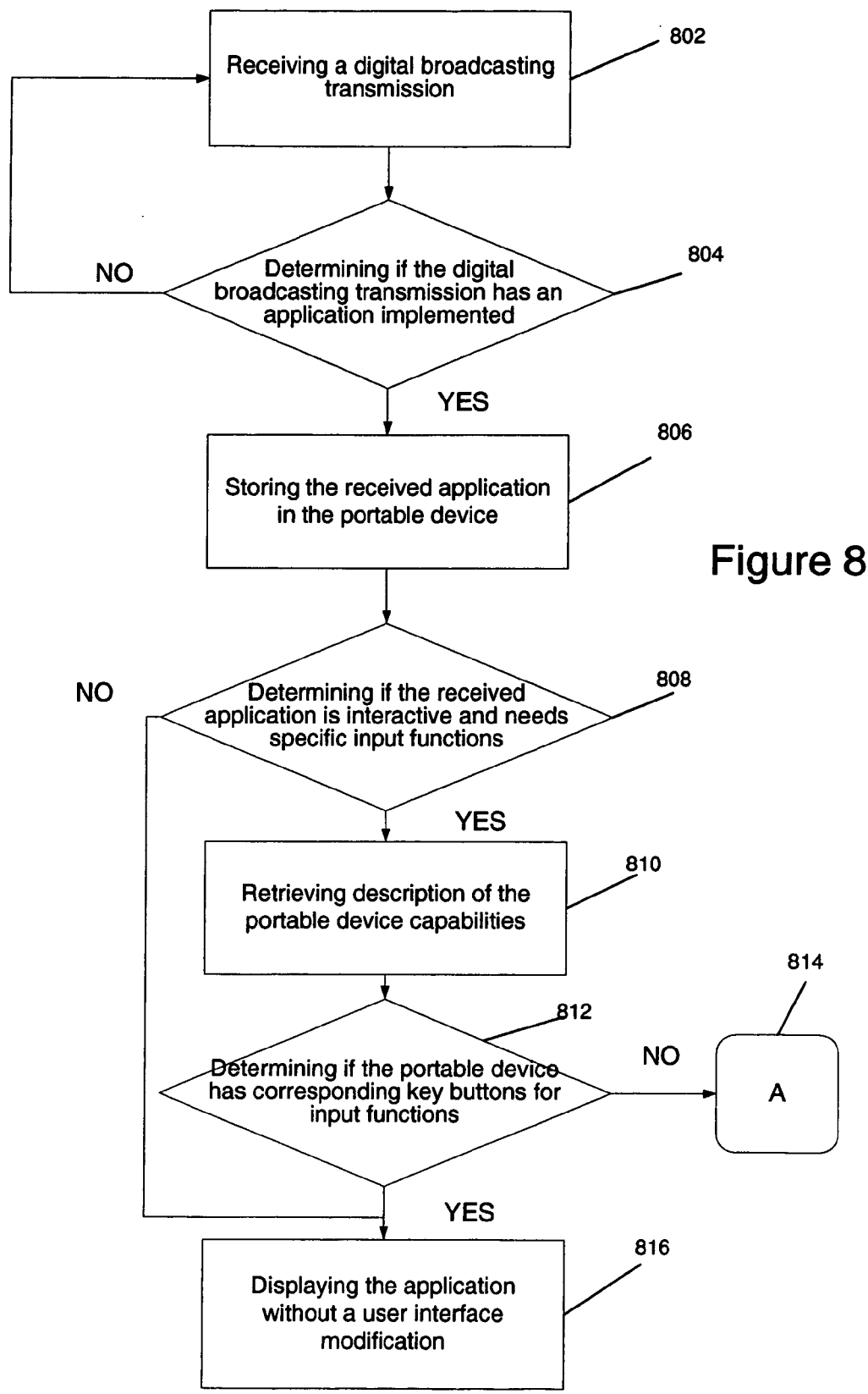
FIG. 8 shows a flow chart for creating an intermediary user interface in accordance with an aspect of the present invention.
Figure 9:
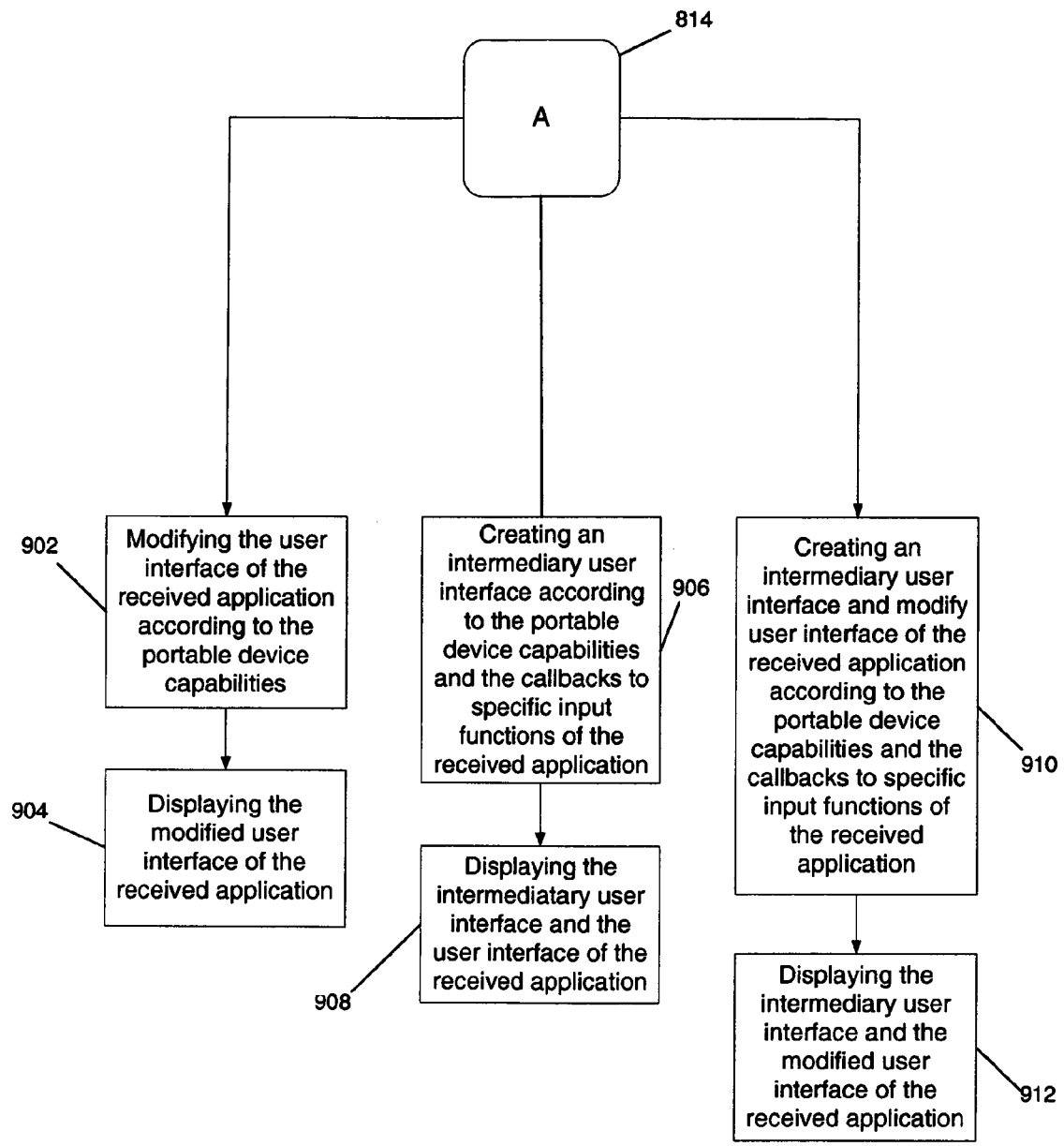
FIG. 9 shows a continuation of the flow chart illustrated in FIG. 8 in accordance with an aspect of the present invention.
Figure 10:
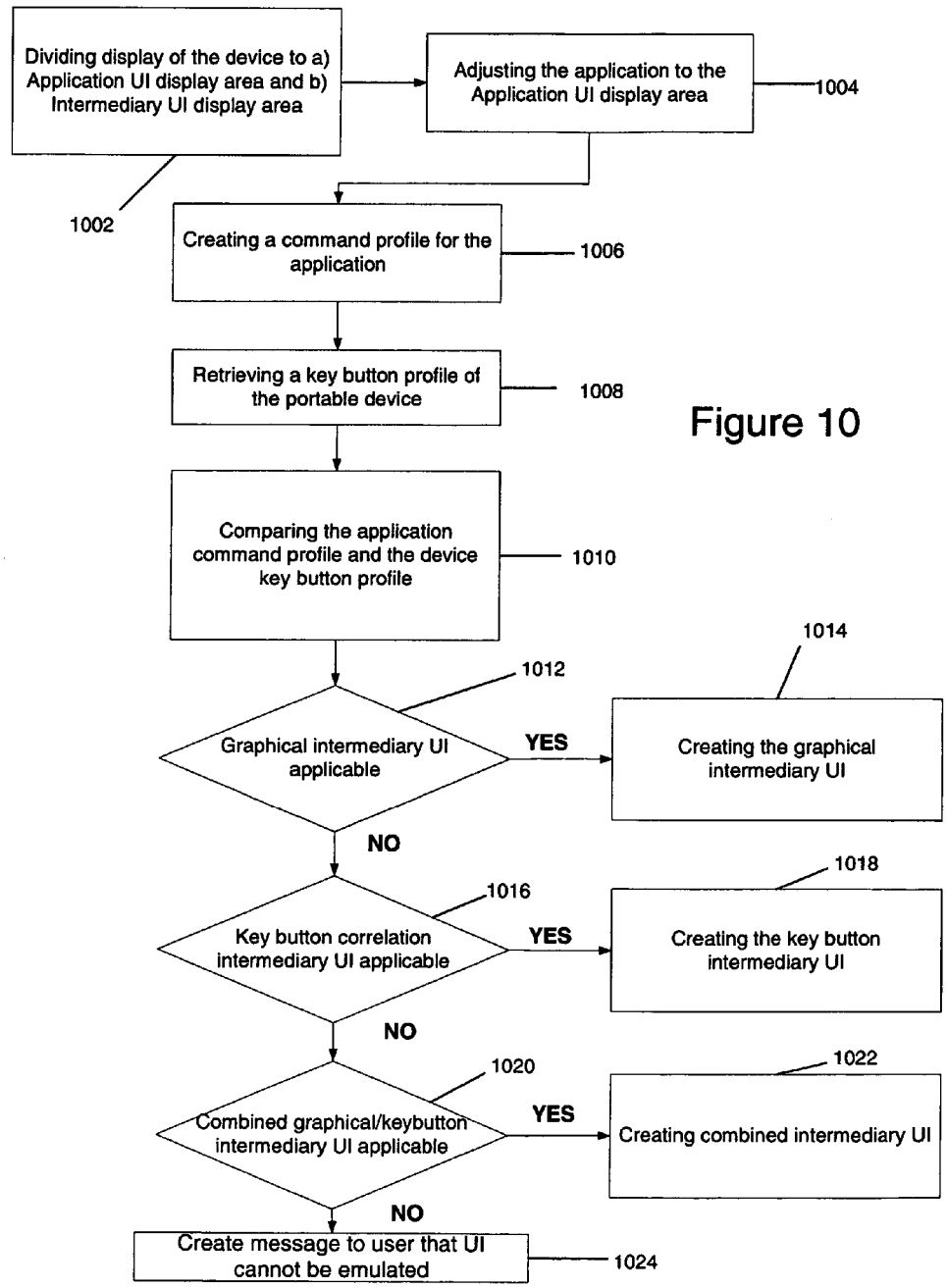
FIG. 10 illustrates the creation of various intermediary user interfaces in accordance with aspects of the present invention.

FIGS. 8-10 describe an exemplary method for creating an intermediary user interface in accordance with various aspects of the invention. In FIG. 8, one embodiment of the invention, in step 802 a digital broadcast transmission may be received by a receiver in a portable device 112. The transmission may be a broadcasted DVB-MHP application or service. Portable device 112 may emulate the application, service and/or the user interface of the application or service or part of the user interface through an Xlet-interface. The portable device may control application execution through an Xlet-interface. The application may have four states: stored, stopped, started and destroyed/removed. A graphics model for MHP applications that may be Java based (such as Java Abstract Windowing Toolkit API and HAVi GUI API) may be utilized to display the application or service. The transmission may also include a Text-TV or Super Teletext transmission. The broadcasted DVB-MHP application may be received and stored as a file in a memory of the portal device 112. User inputs can be handled in multiple ways including with a Java AWT event handling mechanism or through an org.dvb.event API. In both cases, the application may be allowed to own some input events.

In step 804, a determination may be made as to whether the digital broadcasting transmission contains an application and/or service to be implemented. If the digital broadcasting transmission does contain an application and/or service to be implemented, the method continues by storing the received application and/or service in memory of the portable device 112 (step 806). Next, in step 808 a determination may be made if the application and/or service is interactive and needs specific input functions to be implemented. At the same step 808 also commands or input functions of the application may be determined. If the application and/or service does not need specific input functions, the application and/or service may be displayed without modification on the display 136 of portable device 112. If the application and/or service does need specific input functions then the particular portable devices capabilities, such the device key button profile 750 may be retrieved from the portables devices memory in step 810.

Next, step 812 may determine if the portable device 112 has corresponding key buttons 303 for the input functions determined in step 808. If the portable device 112 has corresponding key button 303 for the input functions then the application and/or service may be displayed without modification on the display 136 of the portable device 112. If the portable device 112 does not have corresponding key buttons 303 for the input functions, then the user interface may be modified or an intermediary user interface may be created which are illustrated in three alterative embodiments in FIG. 8 beginning at step 814.

In a first embodiment of the invention where the application and/or service has specific input functions and the portable device does not have corresponding key buttons, the user interface of the application may be modified according to the portable devices capabilities as illustrated in step 902. Next, in step 904, the modified user interface may be displayed on the display 136 of the portable device 112.

In a second alternative embodiment (step 906) of the invention, where the application and/or service has specific input functions and the portable device does not have corresponding key buttons, an intermediary user interface may be created according to the portable devices capabilities and callbacks to specific input functions. Next, in step 908 the created intermediary user interface may be displayed on the display 136 of the portable device 112.

In a third alternative embodiment (step 910) of the invention where the application and/or service has specific input functions and the portable device 112 does not have corresponding key buttons, an intermediary user interface may be created according to the portable devices capabilities and callbacks to specific input functions. Additionally, the user interface of the application may be modified according to the portable devices capabilities. Next, in step 912 the created intermediary user interface and the modified application user interface may be displayed on the display 136 of the portable device 112.

The creation of an intermediary user interface for the second and third embodiments is further illustrated in FIG. 10. In FIG. 10 at step 1002, the user interface may be divided into one or more application user interface display areas and one or more intermediary user interface display areas. In step 1004, the application and/or service may be adjusted to the application user interface display area. Next, at step 1006 a command profile for the application and/or service may be created. The command profile may comprise type/content of the commands, number of the commands and their location on the display 136. In addition, the coordinates for the locations may also be determined by using a defined coordinate system.

In step 1008, a key button profile may be retrieved from the memory of the portable device. The key button profile may comprise type/content/name/description or any metadata of the key buttons, number of the key buttons and their location on the display 136 by using a defined coordinate system. Next, in step 1010 the key button profile and command profile are compared.

A graphical intermediary user interface may be created in step 1012 if the number of the key buttons on the side of the display of the user device is greater than or equal to the number of the application commands. If the graphical intermediary user interface is created in step 1012, then in step 1014 the graphical intermediary user interface may be displayed on the display 136 of the portable device 112.

A key button correlation intermediary user interface may be created in step 1016 if the number of key buttons on the side of the display of the portable device is less than the number of application and/or service commands corresponding to the application and/or service. If the key button correlation intermediary user interface is created in step 1016, then in step 1018 the graphical intermediary UI may be displayed on the display 136 of the portable device 112.

A combination of a location graphical intermediary user interface and key button correlation intermediary user interface may be created in step 1020 if the number of the key buttons on the side of the display of the user device is less than the number of application commands and if at least one of the key buttons are adjacent to the locations of the commands corresponding to the application and/or service. If the combination of a location graphical intermediary user interface and key button correlation intermediary user interface is created in step 1020, then in step 1022 the graphical intermediary user interface may be displayed on the display 136 of the portable device 112. Finally, in step 1024, a message may be displayed on display 136 of portable device 112 if the user interface can not be emulated.

While illustrative systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Also, the invention has been defined using the appended claims; however these claims are exemplary in that the invention is intended to include the elements and steps described herein in any combination or sub-combination. It will also be appreciated and understood that modifications may be made without departing from the true spirit and scope of the invention.

We claim:

1. A computer-readable medium having computer-executable instructions for performing:
    a) retrieving a command profile for an application, wherein the command profile comprises a number of commands corresponding to the application;
    b) retrieving a key button profile for a digital device;
    c) comparing the command profile and the key button profile;
    d) creating an intermediary user interface based upon the comparison of the command profile and key button profile, wherein the creation of the intermediary user interface comprises a creation of a graphical intermediary user interface if a number of key buttons on a side of a display of the digital device is equal to or more than the number of commands corresponding to the application;
    e) displaying a user interface on the display of the digital device, the user interface divided into at least two display areas, the at least two display areas including a first display area and a second display area, the first display area including an application user interface, the second display area including the intermediary user interface; and
    f) displaying intermediary buttons on the intermediary user interface, the intermediary buttons displayed corresponding to the created intermediary user interface.

2. The computer-readable medium of claim 1, wherein the intermediary buttons are next to the key buttons.

3. The computer-readable medium of claim 1, wherein the intermediary buttons define a content of the commands corresponding to the application.

4. A computer-readable medium having computer-executable instructions for performing:
    a) retrieving a command profile for an application, wherein the command profile comprises a number of commands corresponding to the application;
    b) retrieving a key button profile for a digital device;
    c) comparing the command profile and the key button profile;
    d) creating an intermediary user interface based upon the comparison of the command profile and key button profile, wherein the creation of the intermediary user interface comprises a creation of a specific location graphical intermediary user interface if a number of key buttons is equal to or more than the number of commands and a location of the commands corresponding to the application are located adjacent to the key buttons;

e) displaying a user interface on the display of the digital device, the user interface divided into at least two display areas, the at least two display areas including a first display area and a second display area, the first display area including an application user interface, the second display area including the intermediary user interface; and f) displaying intermediary buttons on the intermediary user interface, the intermediary buttons displayed corresponding to the created intermediary user interface.

5. The computer-readable medium of claim 4, wherein the specific location graphical intermediary user interface is displayed on the second display area of the user interface.

6. The computer-readable medium of claim 4, wherein the intermediary buttons are adjacent to the key buttons.

7. The computer-readable medium of claim 6, wherein the intermediary buttons define a content of the commands corresponding to the application.

8. A computer-readable medium having computer-executable instructions for performing:
   a) retrieving a command profile for an application, wherein the command profile comprises a number of commands corresponding to the application;
   b) retrieving a key button profile for a digital device;
   c) comparing the command profile and the key button profile;
   d) creating an intermediary user interface based upon the comparison of the command profile and key button profile, wherein the creation of the intermediary user interface comprises a creation of a key button correlation intermediary user interface if a number of key buttons on the side of a display is less than the number of commands corresponding to the application;
   e) displaying a user interface on the display of the digital device, the user interface divided into at least two display areas, the at least two display areas including a first display area and a second display area, the first display area including an application user interface, the second display area including the intermediary user interface; and
   f) displaying intermediary buttons on the intermediary user interface, the intermediary buttons displayed corresponding to the created intermediary user interface.

9. The computer-readable medium of claim 8, wherein the key button correlation intermediary user interface is displayed on the second display area of the user interface.

10. The computer-readable medium of claim 8, wherein the intermediary buttons define correlations between the number of commands and the key buttons.

11. The computer-readable medium of claim 10, wherein the correlations are displayed on the second display area of the user interface.

12. A computer-readable medium having computer-executable instructions for performing:
    a) retrieving a command profile for an application, wherein the command profile comprises a number of commands corresponding to the application;
    b) retrieving a key button profile for a digital device;
    c) comparing the command profile and the key button profile;
    d) creating an intermediary user interface based upon the comparison of the command profile and key button profile, wherein the creation of the intermediary user interface comprises a combination of a location graphical intermediary user interface with specific location and key button correlation intermediary if a number of key buttons on the side of a display is less than the number of commands corresponding to the application and if at least one of the key buttons are adjacent to locations of the commands corresponding to the application;
    e) displaying a user interface on the display of the digital device, the user interface divided into at least two display areas, the at least two display areas including a first display area and a second display area, the first display area including an application user interface, the second display area including the intermediary user interface; and
    f) displaying intermediary buttons on the intermediary user interface, the intermediary buttons displayed corresponding to the created intermediary user interface.

13. The computer-readable medium of claim 12, wherein the combination of a location graphical intermediary user interface with specific location and key button correlation intermediary is displayed on the second display area of the user interface.

14. The computer-readable medium of claim 12, wherein the intermediary buttons define correlations between the number of commands and the key buttons if the key buttons are non-adjacent to the commands corresponding to the application.

15. The computer-readable medium of claim 14, wherein the correlations are displayed on the second display area of the user interface.

16. A method comprising:
    a) retrieving a command profile for an application, wherein the command profile comprises a number of commands corresponding to the application;
    b) retrieving a key button profile for a digital device;
    c) comparing the command profile and the key button profile;
    d) creating an intermediary user interface based upon the comparison of the command profile and key button profile, wherein the creation of the intermediary user interface comprises a creation of a graphical intermediary user interface if a number of key buttons on a side of a display of the digital device is equal to or more than the number of commands corresponding to the application;
    e) displaying a user interface on the display of the digital device, the user interface divided into at least two display areas, the at least two display areas including a first display area and a second display area, the first display area including an application user interface, the second display area including the intermediary user interface; and
    f) displaying intermediary buttons on the intermediary user interface, the intermediary buttons displayed corresponding to the created intermediary user interface.

17. The method of claim 16, wherein the intermediary buttons are next to the key buttons.

18. The method of claim 16, wherein the intermediary buttons define a content of the commands corresponding to the application.

19. A method comprising:
    a) retrieving a command profile for an application, wherein the command profile comprises a number of commands corresponding to the application;
    b) retrieving a key button profile for a digital device;
    c) comparing the command profile and the key button profile;
    d) creating an intermediary user interface based upon the comparison of the command profile and key button profile, wherein the creation of the intermediary user interface comprises a creation of a specific location graphical intermediary user interface if a number of key buttons is equal to or more than the number of commands and a location of the commands corresponding to the application are located adjacent to the key buttons;

e) displaying a user interface on the display of the digital device, the user interface divided into at least two display areas, the at least two display areas including a first display area and a second display area, the first display area including an application user interface, the second display area including the intermediary user interface; and f) displaying intermediary buttons on the intermediary user interface, the intermediary buttons displayed corresponding to the created intermediary user interface.

20. The method of claim 19, wherein the specific location graphical intermediary user interface is displayed on the second display area of the user interface.

21. The method of claim 19, wherein the intermediary buttons are adjacent to the key buttons.

22. The method of claim 21, wherein the intermediary buttons define a content of the commands corresponding to the application.

23. A method comprising:
a) retrieving a command profile for an application, wherein the command profile comprises a number of commands corresponding to the application;
b) retrieving a key button profile for a digital device;
c) comparing the command profile and the key button profile;
d) creating an intermediary user interface based upon the comparison of the command profile and key button profile, wherein the creation of the intermediary user interface comprises a creation of a key button correlation intermediary user interface if a number of key buttons on the side of a display is less than the number of commands corresponding to the application;
e) displaying a user interface on the display of the digital device, the user interface divided into at least two display areas, the at least two display areas including a first display area and a second display area, the first display area including an application user interface, the second display area including the intermediary user interface; and
f) displaying intermediary buttons on the intermediary user interface, the intermediary buttons displayed corresponding to the created intermediary user interface.

24. The method of claim 23, wherein the key button correlation intermediary user interface is displayed on the second display area of the user interface.

25. The method of claim 23, wherein the intermediary buttons define correlations between the number of commands and the key buttons.

26. The method of claim 25, wherein the correlations are displayed on the second display area of the user interface.

27. A method comprising:
a) retrieving a command profile for an application, wherein the command profile comprises a number of commands corresponding to the application;
b) retrieving a key button profile for a digital device;
c) comparing the command profile and the key button profile;
d) creating an intermediary user interface based upon the comparison of the command profile and key button profile, wherein the creation of the intermediary user interface comprises a combination of a location graphical intermediary user interface with specific location and key button correlation intermediary if a number of key buttons on the side of a display is less than the number of commands corresponding to the application and if at least one of the key buttons are adjacent to locations of the commands corresponding to the application;
e) displaying a user interface on the display of the digital device, the user interface divided into at least two display areas, the at least two display areas including a first display area and a second display area, the first display area including an application user interface, the second display area including the intermediary user interface; and
f) displaying intermediary buttons on the intermediary user interface, the intermediary buttons displayed corresponding to the created intermediary user interface.

28. The method of claim 27, wherein the combination of a location graphical intermediary user interface with specific location and key button correlation intermediary is displayed on the second display area of the user interface.

29. The method of claim 27, wherein the intermediary buttons define correlations between the number of commands and the key buttons if the key buttons are non-adjacent to the commands corresponding to the application.

30. The method of claim 29, wherein the correlations are displayed on the second display area of the user interface.

31. An apparatus comprising:
a display;
a memory configured to store computer executable instructions; and
a processor for controlling operation of the apparatus, the processor configured to perform the computer executable instructions stored in the memory, the computer executable instructions when executed perform:
a) retrieving a command profile for an application, wherein the command profile comprises a number of commands corresponding to the application;
b) retrieving a key button profile;
c) comparing the command profile and the key button profile;
d) creating an intermediary user interface based upon the comparison of the command profile and key button profile, wherein the creation of the intermediary user interface comprises a creation of a graphical intermediary user interface if a number of key buttons on a side of a display of the apparatus is equal to or more than the number of commands corresponding to the application;
e) displaying a user interface on the display of the apparatus, the user interface divided into at least two display areas, the at least two display areas including a first display area and a second display area, the first display area including an application user interface, the second display area including the intermediary user interface; and
f) displaying intermediary buttons on the intermediary user interface, the intermediary buttons displayed corresponding to the created intermediary user interface.

32. The apparatus of claim 31, wherein the intermediary buttons are next to the key buttons.

33. The apparatus of claim 31, wherein the intermediary buttons define a content of the commands corresponding to the application.

34. An apparatus comprising:
a display;
a memory configured to store computer executable instructions; and
a processor for controlling operation of the apparatus, the processor configured to perform the computer executable instructions stored in the memory, the computer executable instructions when executed perform:

a) retrieving a command profile for an application, wherein the command profile comprises a number of commands corresponding to the application;
b) retrieving a key button profile;
c) comparing the command profile and the key button profile;
d) creating an intermediary user interface based upon the comparison of the command profile and key button profile, wherein the creation of the intermediary user interface comprises a creation of a specific location graphical intermediary user interface if a number of key buttons is equal to or more than the number of commands and a location of the commands corresponding to the application are located adjacent to the key buttons;
e) displaying a user interface on the display of the apparatus, the user interface divided into at least two display areas, the at least two display areas including a first display area and a second display area, the first display area including an application user interface, the second display area including the intermediary user interface; and
f) displaying intermediary buttons on the intermediary user interface, the intermediary buttons displayed corresponding to the created intermediary user interface.

35. The apparatus of claim 34, wherein the specific location graphical intermediary user interface is displayed on the second display area of the user interface.

36. The apparatus of claim 34, wherein the intermediary buttons are adjacent to the key buttons.

37. The apparatus of claim 36, wherein the intermediary buttons define a content of the commands corresponding to the application.

38. An apparatus comprising:
a display;
a memory configured to store computer executable instructions; and
a processor for controlling operation of the apparatus, the processor configured to perform the computer executable instructions stored in the memory, the computer executable instructions when executed perform:
a) retrieving a command profile for an application, wherein the command profile comprises a number of commands corresponding to the application;
b) retrieving a key button profile;
c) comparing the command profile and the key button profile;
d) creating an intermediary user interface based upon the comparison of the command profile and key button profile, wherein the creation of the intermediary user interface comprises a creation of a key button correlation intermediary user interface if a number of key buttons on the side of a display is less than the number of commands corresponding to the application;
e) displaying a user interface on the display of the apparatus, the user interface divided into at least two display areas, the at least two display areas including a first display area and a second display area, the first display area including an application user interface, the second display area including the intermediary user interface; and
f) displaying intermediary buttons on the intermediary user interface, the intermediary buttons displayed corresponding to the created intermediary user interface.

39. The apparatus of claim 38, wherein the key button correlation intermediary user interface is displayed on the second display area of the user interface.

40. The apparatus of claim 38, wherein the intermediary buttons define correlations between the number of commands and the key buttons.

41. The apparatus of claim 40, wherein the correlations are displayed on the second display area of the user interface.

42. An apparatus comprising:
a display;
a memory configured to store computer executable instructions; and
a processor for controlling operation of the apparatus, the processor configured to perform the computer executable instructions stored in the memory, the computer executable instructions when executed perform:
a) retrieving a command profile for an application, wherein the command profile comprises a number of commands corresponding to the application;
b) retrieving a key button profile;
c) comparing the command profile and the key button profile;
d) creating an intermediary user interface based upon the comparison of the command profile and key button profile, wherein the creation of the intermediary user interface comprises a combination of a location graphical intermediary user interface with specific location and key button correlation intermediary if a number of key buttons on the side of a display is less than the number of commands corresponding to the application and if at least one of the key buttons are adjacent to locations of the commands corresponding to the application;
e) displaying a user interface on the display of the apparatus, the user interface divided into at least two display areas, the at least two display areas including a first display area and a second display area, the first display area including an application user interface, the second display area including the intermediary user interface; and
f) displaying intermediary buttons on the intermediary user interface, the intermediary buttons displayed corresponding to the created intermediary user interface.

43. The apparatus of claim 42, wherein the combination of a location graphical intermediary user interface with specific location and key button correlation intermediary is displayed on the second display area of the user interface.

44. The apparatus of claim 42, wherein the intermediary buttons define correlations between the number of commands and the key buttons if the key buttons are non-adjacent to the commands corresponding to the application.

45. The apparatus of claim 44, wherein the correlations are displayed on the second display area of the user interface.

* * * * *